(12) United States Patent
Yamazaki

(10) Patent No.: US 9,508,377 B2
(45) Date of Patent: Nov. 29, 2016

(54) HOLOGRAM RECORDING AND REPRODUCING DEVICE, AND ANGULAR MULTIPLEXING RECORDING AND REPRODUCING METHOD

(71) Applicant: HITACHI CONSUMER ELECTRONICS CO., LTD., Yokohama-shi, Kanagawa (JP)

(72) Inventor: Kazuyoshi Yamazaki, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 14/781,595

(22) PCT Filed: Apr. 5, 2013

(86) PCT No.: PCT/JP2013/060424
§ 371 (c)(1),
(2) Date: Oct. 1, 2015

(87) PCT Pub. No.: WO2014/162582
PCT Pub. Date: Oct. 9, 2014

(65) Prior Publication Data
US 2016/0055875 A1    Feb. 25, 2016

(51) Int. Cl.
| | | |
|---|---|---|
| G11B 7/0065 | (2006.01) | |
| G11B 7/09 | (2006.01) | |
| G03H 1/26 | (2006.01) | |
| G11B 7/085 | (2006.01) | |
| G11B 7/1356 | (2012.01) | |

(Continued)

(52) U.S. Cl.
CPC ............. *G11B 7/0065* (2013.01); *G03H 1/265* (2013.01); *G11B 7/08564* (2013.01); *G11B 7/094* (2013.01); *G11B 7/1353* (2013.01); *G11B 7/1356* (2013.01); *G11B 20/18* (2013.01); *G03H 2001/0491* (2013.01); *G03H 2001/2244* (2013.01); *G11B 7/0037* (2013.01)

(58) Field of Classification Search
None
See application file for complete search history.

(56) References Cited

U.S. PATENT DOCUMENTS

| | | |
|---|---|---|
| 2009/0207710 A1 | 8/2009 | Ayres et al. |
| 2012/0188618 A1 | 7/2012 | Ishii et al. |

FOREIGN PATENT DOCUMENTS

| | | |
|---|---|---|
| JP | 2008-287077 A | 11/2008 |
| JP | 2012-154979 A | 8/2012 |

OTHER PUBLICATIONS

International Search Report of PCT/JP2013/060424.

*Primary Examiner* — Brian Butcher
(74) *Attorney, Agent, or Firm* — Mattingly & Malur, PC

(57) ABSTRACT

A hologram recording and reproducing device and an angular multiplexing recording and reproducing method capable of detecting an angular error signal for which, in a two-beam angle multiplexing method, high-speed reproducing can be achieved with a superior recovered signal. A branch element branches a light beam, emitted from a light source, into a signal light and a reference light. Angle-variable elements modify the incident angle of the reference light that is incident to the optical information recording medium. A spatial light modulator adds information to the signal light; and an objective lens radiates the signal light to the optical information recording medium. An imaging element detects diffracted light generated from a recording region when the reference light is radiated upon the optical information recording medium; a detection system detects at least two angular error signals for controlling the angle-variable elements; and switching is performed between the two angular error signals.

14 Claims, 15 Drawing Sheets

(51) Int. Cl.
  *G11B 7/1353* (2012.01)
  *G11B 20/18* (2006.01)
  *G11B 7/0037* (2006.01)
  *G03H 1/04* (2006.01)
  *G03H 1/22* (2006.01)

FIG. 11
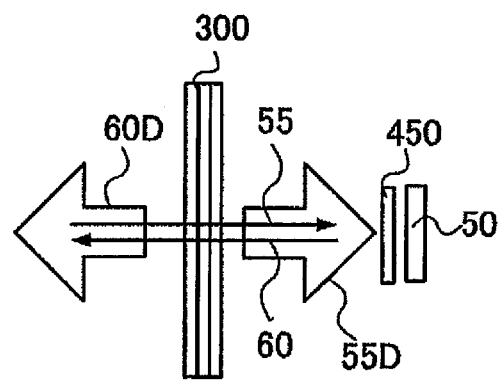
(a)
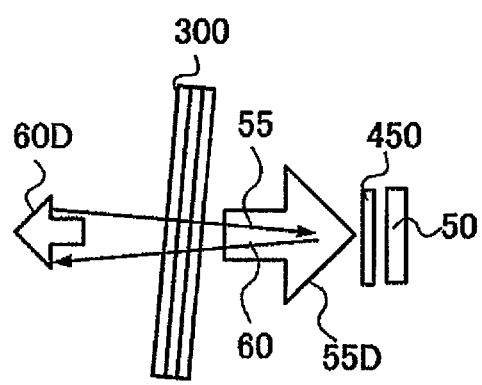
(b)
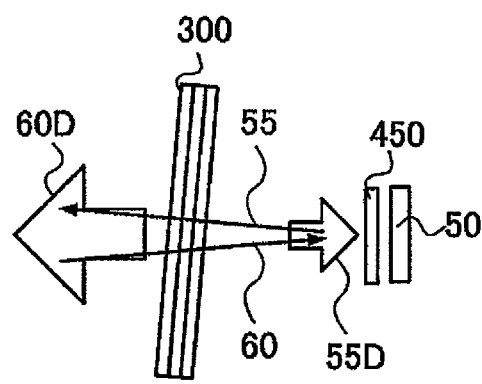
(c)

HOLOGRAM RECORDING AND REPRODUCING DEVICE, AND ANGULAR MULTIPLEXING RECORDING AND REPRODUCING METHOD

TECHNICAL FIELD

The present invention relates to a hologram recording/reproducing device and also to angular multiplexing recording/reproducing method.

BACKGROUND ART

In recent years, a two-beam angular multiplexing technique has been proposed as hologram technology capable of recording and reproducing a large volume of data at high speeds. This technique faces a challenge to controlling a relative angle of beams of signal light and reference light.

For this challenge, Patent Literature 1 discloses therein a scheme to control the relative angle of a reference beam with respect to a signal beam by detecting the signal beam by an image-sensing element in order to search the relative angle of a signal beam and a reference beam, computing per recording angle a signal-to-noise ratio (SNR) which is reproducing performance, and predicting the next relative angle from such value.

CITATION LIST

Patent Literature

Patent Literature 1: US 2009/0207710 A1

SUMMARY OF INVENTION

Technical Problem

While Patent Literature 1 offers searchability of the relative angle of a signal beam and a reference beam, it is faced with three major issues. The first is high-speed reproduction; second, reproducing performance; third, high-accuracy recording and resistance to disturbance.

In the case of the constitution of Patent Literature 1, it has an effect of eliminating the need to add a detection unit; however, there is a challenge to high-speed reproduction since a relative angle control signal is generated after having detected a reproduced or "recovered" signal by an image sensor and then computed the SNR.

In addition, Patent Literature 1 is characterized by controlling it to an angle which is displaced by a minute amount from the relative angle at which the recovered signal becomes superior in order to generate an angle control signal of the reference beam. Consequently, it is obvious that the best possible recovered signal is not obtainable.

Furthermore, in the case of Patent Literature 1, a control method taught thereby is to displace the angle of the reference beam by a degree corresponding to a predetermined angle; so, there is a problem that the control accuracy decreases due to the influence of disturbance or else during recording.

As stated above, there is a challenge to enabling achievement of high-speed reproduction in the two-beam angular multiplexing technique and, simultaneously, detection of an angle error signal of a reference beam capable of obtaining more excellent recovered signals.

It is therefore an object of the present invention to provide a hologram recording/reproducing device and angle-multiplex recording/reproducing method of the type using two-beam angular multiplexing technology, which are able to realize high-speed reproduction and also to detect one or more than one angle error signal which ensures acquisition of better quality of recovered signals.

Solution to Problem

The above-stated object is attainable, for example, by a hologram recording/reproducing device of the type employing angle-multiplex recording/reproducing methodology using beams of signal light and reference light, which device includes an angle-variable element for varying the angle of incidence of a reference beam falling onto an optical information storage medium and a detection system for detecting at least two, first and second angle error signals for use in control of the angle-variable element.

Advantageous Effects of Invention

It is possible to provide a hologram recording/reproducing device and angular multiplexing recording/reproducing method capable of realizing high-speed reproduction in the two-beam angular multiplexing scheme and also capable of detecting one or more angle error signals which ensure acquisition of recovered signals with better quality.

BRIEF DESCRIPTION OF DRAWINGS

FIG. 11 is a diagram for explanation of advantageous effects in the embodiment 3.

DESCRIPTION OF EMBODIMENTS

Embodiment 1

Figure 1:
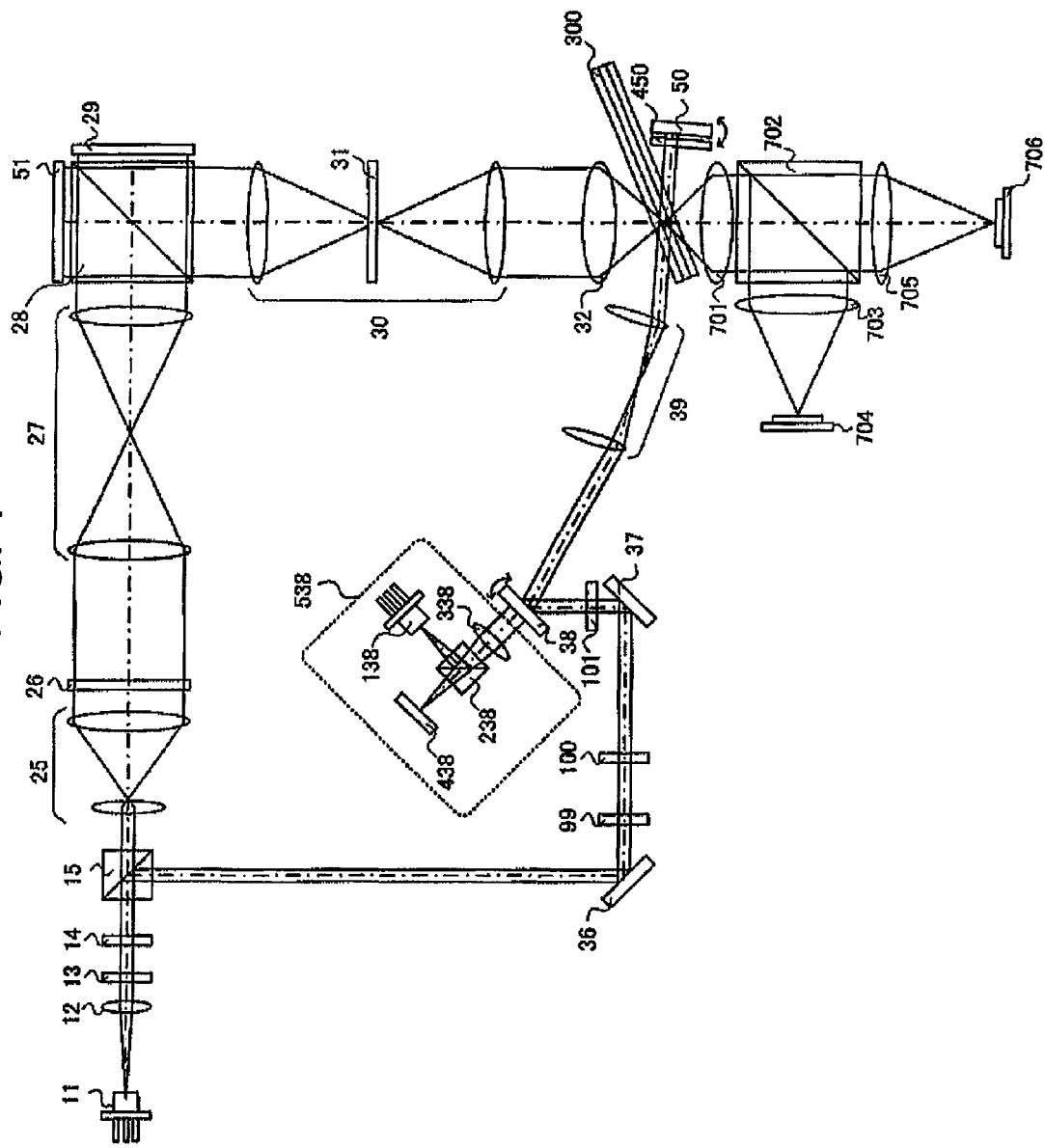
FIG. 1 is a diagram for explanation of an optical system in an embodiment 1.
Figure 15:
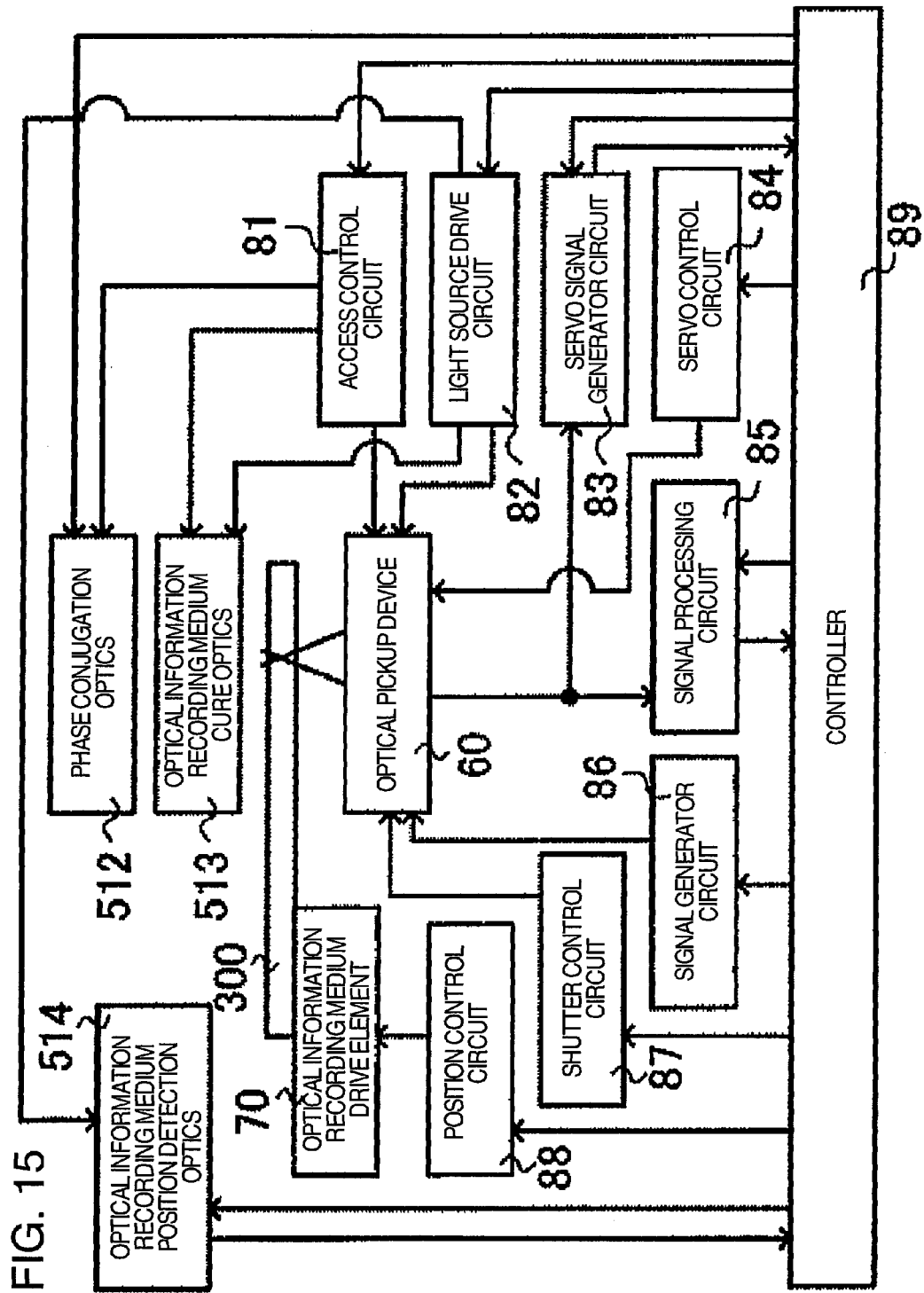
FIG. 15 is a diagram showing a hologram record/reproduction device in the embodiment 1.

FIG. 15 shows an overall configuration of a hologram recording/reproducing device in accordance with a first embodiment of this invention. This hologram recording/reproducing device is arranged as shown in FIG. 1 for example to include an optical pickup device 60, phase conjugation optics 512, optical information recording medium cure optics 513, optical information recording medium position detection optics 514 and optical information storage medium drive element 70, wherein an optical information storage medium 300 is arranged so that its relative recording position is changeable with respect to the optical pickup device.

The optical pickup device 60 plays a role of emitting a reference beam and signal beam to the optical information storage medium 300 and recording digital information using a hologram(s). In this event, an information signal to be recorded is sent through a signal generation circuit 86 to a spatial light modulator in the optical pickup device 60 under control of a controller 89; the signal beam is modulated by the spatial light modulator. In the case of reproduction or "recovery" of the information recorded in optical information storage medium 300, phase conjugate light of the reference beam emitted from optical pickup device 60 is produced by the phase conjugation optics 512. Note here that the phase conjugation optics 512 indicates a galvano mirror 50 in the case of FIG. 4 for example. Additionally, the phase conjugate light is a light wave traveling in the opposite direction while retaining the same wave surface as that of input light. Recovered light to be reproduced by the phase conjugate light is detected by an imaging element in optical pickup device 60, thereby reproducing a signal by a signal processing circuit 85. Irradiation time lengths of the reference beam and signal beam falling on the optical information storage medium 300 are adjustable by controlling the open/close time of a shutter in optical pickup device 60, which will be described later, by the controller 89 through a shutter control circuit 87. The module of optical information recording medium cure optics 513 functions to produce an optical beam for use in pre-cure and post-cure of the optical information storage medium 300. Here, the precure is a pre-process of casting in advance a predefined optical beam prior to irradiation of the reference beam and signal beam at a desired position in the event of recording information at a desired position within the optical information storage medium 300. The postcure is a post-process of casting a predefined light beam after having recorded the information at a desired position within optical information storage medium 300 in order to disable additional recording at such desired position. The module of optical information recording medium position detection optics 514 is used to detect a position of optical information storage medium 300. In the case of adjusting optical information storage medium 300 to a predetermined position, a position-responsive signal is detected by the optical information recording medium position detection optics 514; using the signal detected, it is possible to control the position of optical information storage medium 300 by the controller 89 through a position control circuit 88.

Predefined light source driving current is supplied from a light source drive circuit 82 to light sources in the optical pickup device 60, optical information recording medium cure optics 513 and optical information recording medium position detection optics 514, thereby enabling each light source to emit an optical beam with a predetermined light amount.

Holography-used recording techniques have the tendency of letting the allowable margin of error with respect to the inclination of optical information storage medium 300, for example, become very small because these are techniques capable of recording ultrahigh-density information. Therefore, in the optical pickup device 60 of this embodiment, a signal for detecting an angle error signal is outputted. Using this signal, a servo signal generation circuit 83 generates an angle error signal 1 and angle error signal 2 for use in servo control to thereby control an angle-variable element, such as a galvano mirror or the like, via a servo control circuit 84. Additionally, the servo control circuit has its function of performing switching between the angle error signal 1 and angle error signal 2 for changing the control of the angle-variable element, such as galvano mirror or the like.

It is noted that the optical pickup device 60, phase conjugation optics 512, optical information recording medium cure optics 513 and optical information recording medium position detection optics 514 may be structurally simplified by grouping together some optical system configurations or all optical system configurations in a single module.

FIG. 1 shows an optical system of the optical pickup device in the hologram recording/reproducing device of the type using two-beam angular multiplexing technique of this embodiment.

Using FIG. 1, a reproducing method of this embodiment will be described below. An optical beam emitted from light source 11 travels through a collimating lens 12 for conversion to a beam having a desired diameter; thereafter, it passes through a shutter 13 and enters a polarization-variable element 14. Then, the optical beam is converted by polarization-variable element 14 into a S-polarized beam. This polarization-variable element 14 is an optical element which performs conversion to a predetermined polarized beam in response to recording or reproducing.

The optical beam that has passed through the polarization-variable element 14 is reflected at a polarizing beam splitter (PBS) prism 15. The optical beam reflected at PBS prism 15 will be called the reference beam.

The reference beam that reflected at PBS prism 15 is reflected at a mirror 36, entering wavelength plate 99. The wavelength plate 99 is an element which converts the incoming S-polarized beam into a polarization component consisting of a P-polarized beam and an S-polarized beam. Then, the reference beam that has penetrated wavelength plate 99 enters a Wollaston prism 100. Wollaston prism 100 is an optical element which splits an incident optical beam into two beams whose propagation directions are different by an angle $\phi$ from each other in compliance with the polarization of the incident beam. Consequently, the optical beam that passed through Wollaston prism 100 becomes light beams of two propagation directions that are different in polarization. Here, a light beam with S-polarization of such two beams will be called the reference beam; a remaining beam with P-polarization will be called the control beam.

The two light beams that have passed through Wollaston prism 100 are reflected at a mirror 37, entering an angle correction element 101. The angle correction element 101 has a mechanism which enables Wollaston prism to rotate, and is an element for correcting an angle in a direction approximately perpendicular to the direction of angle-multiplex recording being applied to optical information storage medium 300. The light beam that exited from angle correction element 101 enters galvano mirror 38 (first angle-variable element). The galvano mirror 38 is an optical element capable of controlling the angle of mirror. Because of this, using the galvano mirror makes it possible to vary the angle of incidence of the reference beam to optical information storage medium 300, thereby enabling achievement of angle-multiplex recording/reproducing. Additionally, the galvano mirror 38 is associated with optics 538 for measuring a change in mirror angle.

The reference beam that reflected at galvano mirror 38 progresses through a scanner lens 39 to enter optical information storage medium 300. At this time, when the reference beam and control beam is incident to a recording region within optical information storage medium 300, a couple of diffracted beams take place in the direction of a lens 701 according to incidence angles thereof. These diffracted beams penetrate the lens 701 to enter PBS prism 702. Here, the diffracted beam yielded at optical information storage medium 300 is the same in polarization as the incoming polarized beam; thus, the diffracted beam generated from the reference beam is reflected at PBS prism 702 whereas the diffracted beam yielded from the control beam penetrates PBS prism 702. And, the diffracted beams enter photosensitive parts of photodetectors 704 and 706 through detection lenses 703 and 705, respectively.

Here, letting a signal obtained at the photodetector 704 be represented by S1 and a signal obtained at photodetector 706 be given as S2, the angle error signal 1 (AES1) is indicated by:

$$AES1=S1-S2. \quad [\text{MATH. 1}]$$

Note that the signal S1, S2 is a total sum signal which has detected an entire light amount of its corresponding diffracted beam.

On the other hand, the reference beam and control beam that have penetrated the optical information storage medium 300 behave to pass through a ¼ wavelength plate 450 to enter galvano mirror 50 (second angle-variable element). Galvano mirror 50 is being controlled, based on angle information mathematically converted from a voltage value and/or current value and inputted to galvano mirror 38, to ensure that the incident reference beam is almost perpendicular to galvano mirror 50. And, the two light beams that have reflected at galvano mirror 38 penetrate the ¼ wavelength plate 450 again. Here, owing to the penetration of ¼ wavelength plate 450 before and after the reflection at galvano mirror 38, the polarization is converted, resulting in the reference beam becoming a P-polarized beam and in the control beam becoming an S-polarized beam.

The two light beams that have penetrated the ¼ wavelength plate 450 enter the optical information storage medium 300. Then, by the reference beam and control beam, a recovered beam (diffracted beam of the reference beam) having certain information and a diffracted beam of the control beam arise from the recording region in the direction of an objective lens 32.

These diffracted beams travel through objective lens 32, relay lens 30 and spatial filter 31 to enter PBS prism 28. This PBS prism permits penetration of the reproduced or recovered light that is a P-polarized beam while causing reflection of the diffracted beam of the control beam, which light is an S-polarized beam. An imaging element 51 detects the recovered light that has penetrated PBS prism 28. Then, based on the recovered light falling on the imaging element 51, recovered image data is produced.

Next, the angle error signal 1 and the angle error signal 2 obtainable from optics 538 are used to perform rotation control of galvano mirror 38, thereby varying the angle of incidence of the reference beam to optical information storage medium 300. This results in production of angle-multiplexed recovered image data in optical information storage medium 300.

In this embodiment, its feature lies in controlling the galvano mirror 38 by respective ones of the angle error signal 1 and angle error signal 2 while performing switching between these signals. Here, an explanation will be given of a method for detecting the angle error signals.

Figure 2:
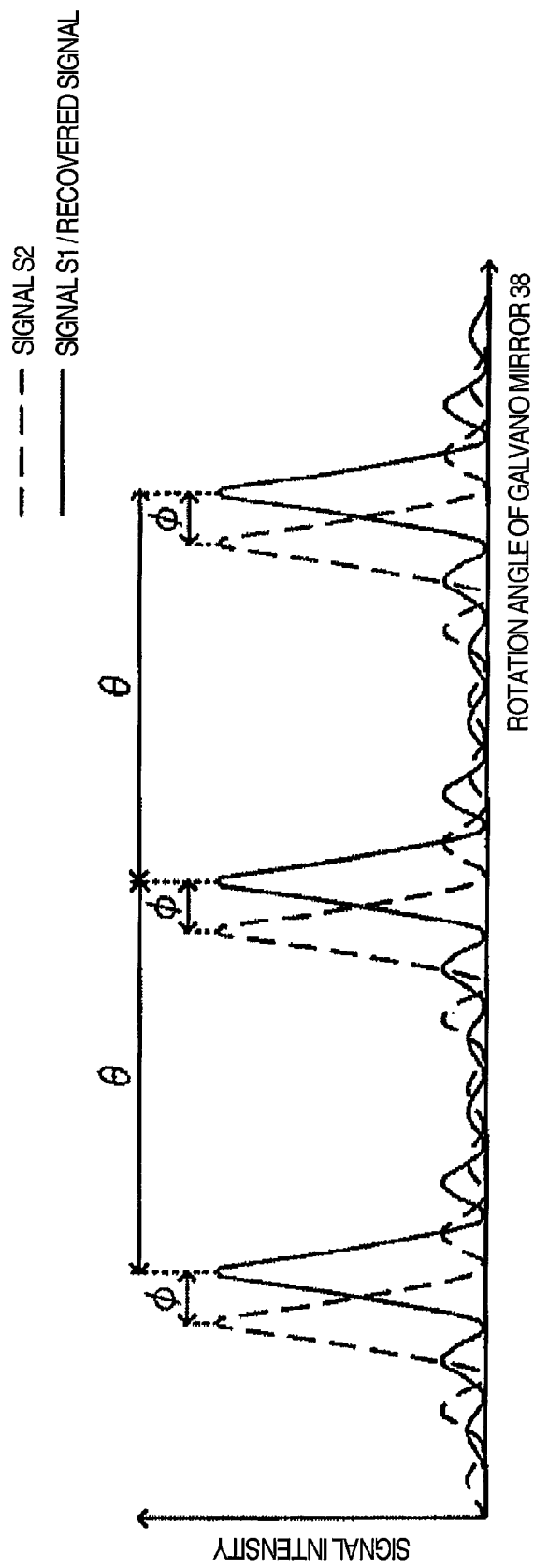
FIG. 2 is a diagram showing a light quantity of a diffracted beam with respect to a rotation angle of galvano mirror 38 in the embodiment 1.

First, a detection method of the angle error signal 1 will be explained. FIG. 2 shows signal intensities of a signal S1 obtained at the photodetector 704 and a signal S2 obtained at the photodetector 706 when the galvano mirror 38 is driven to rotate, along with the signal intensity of a recovered signal. Additionally, each signal intensity is normalized by a maximal value.

It can be seen that the signals S1 and S2 are displaced by angle φ relative to a rotation angle of the galvano mirror 38. This is because two angle-different light beams are yielded by Wollaston prism 100, which are split and detected.

Figure 3:
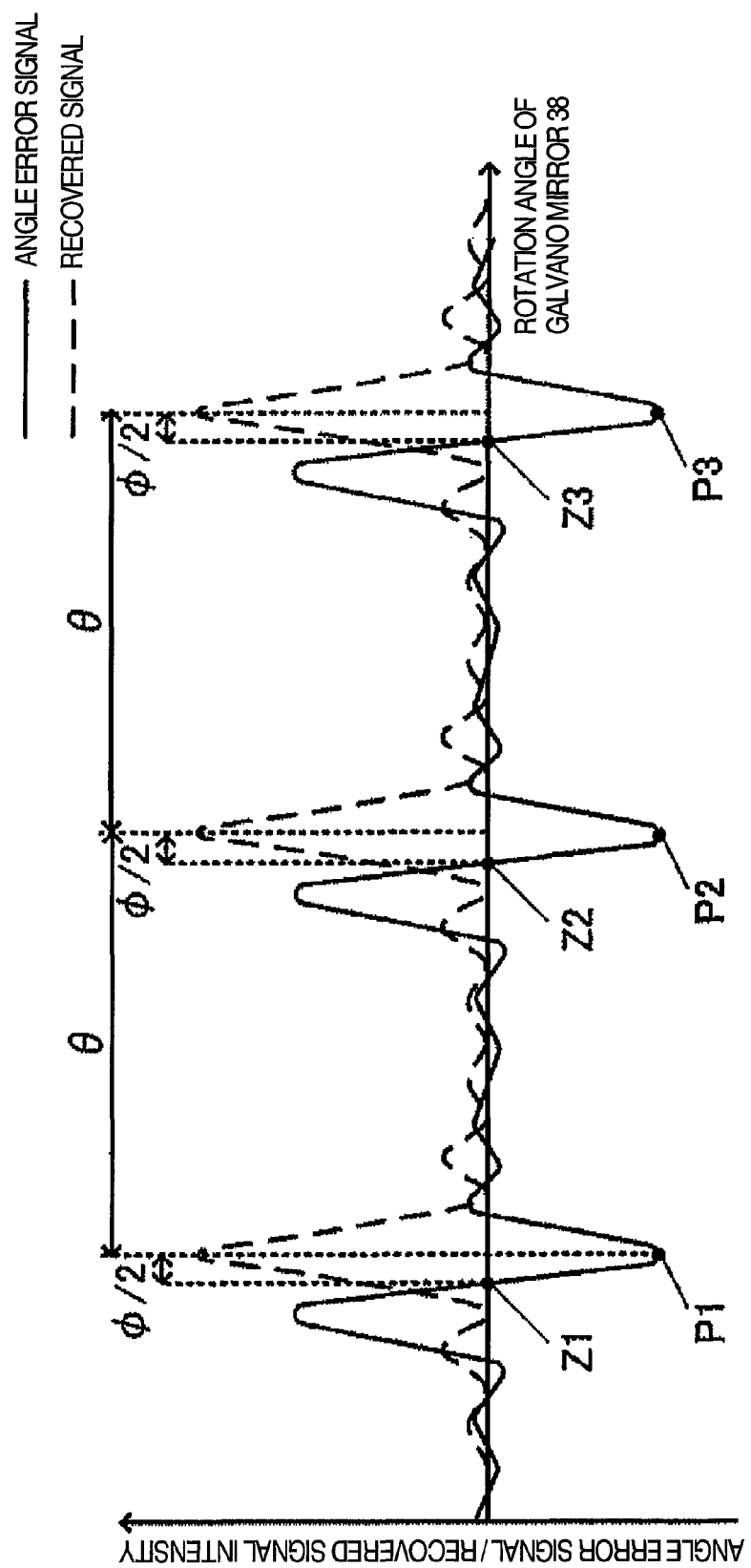
FIG. 3 is a diagram showing an angle error signal 1 in the embodiment 1.

FIG. 3 shows an angle differential signal 1 of this invention to be computed from the signals S1 and S2 of FIG. 2. It can be seen from FIG. 3 that an angle Z1 (Z2, Z3) at which the angle error signal performs zero-crossing is displaced relative to an angle P1 (P2, P3) at which the recovered signal becomes maximal. Meanwhile, an angle deviation amount of P1 and Z1 (P2 and Z2; P3 and Z3) is approximately φ/2 since the angle difference of signals S1 and S2 shown in FIG. 2 is φ.

Note here that when usual control is performed using the angle error signal 1, it is difficult to accomplish control to the angle P1 at which the recovered signal becomes maximal. In traditional optical disks such as Blu-ray Discs (BDs) or the like for example, an offset has been given electrically in order to offset by control; however, in the case of the angle error signal shown in FIG. 3, there is a problem that similar control is not executable because it becomes the bottom of signal (or peak). In view of this, in this embodiment, the angle error signal 2 is used to control the angle of the reference beam using the angle error signal 2 to the angle at which the recovered signal is maximized.

Next, an explanation will be given of a detection method of the angle error signal 2. The angle error signal 2 is generated by the optics 538 of FIG. 1.

An optical beam leaving a light source 138 is reflected at prism 238 and passes through collimate lens 338 and then converted into almost parallel rays of light. The optical beam of such almost parallel light is reflected off at mirror 38 to enter a photosensitive part of photodetector 438 through collimate lens 338 and prism 238, thereby forming a spot thereon. The photosensitive part of photodetector 438 is configured from a plurality of pixels, and has the function of detecting the position of an incident light spot.

With this arrangement, rotation of the galvano mirror 38 results in deviation of the spot position on photodetector 438. Accordingly, by detecting an amount of this deviation, it becomes possible to achieve conversion to a tilt amount of the galvano mirror 38. In this embodiment, the angle error signal is generated in such a manner as to correct the angle deviation amount of P1 and Z1 (P2 and Z2; P3 and Z3) at the time of control by the angle error signal 1. Here, the angle error signal 2 (AES2) is representable by:

$$AES2=Xi-X0. \quad [\text{MATH. 2}]$$

Note that X0 is the spot position on photodetector 438 at a time point that the angle error signal 1 becomes Z1 (Z2, Z3), and Xi is a calculation result (target position) of the spot position on photodetector 438 when it deviates from X0 by an angle of about φ/2.

Figure 4:
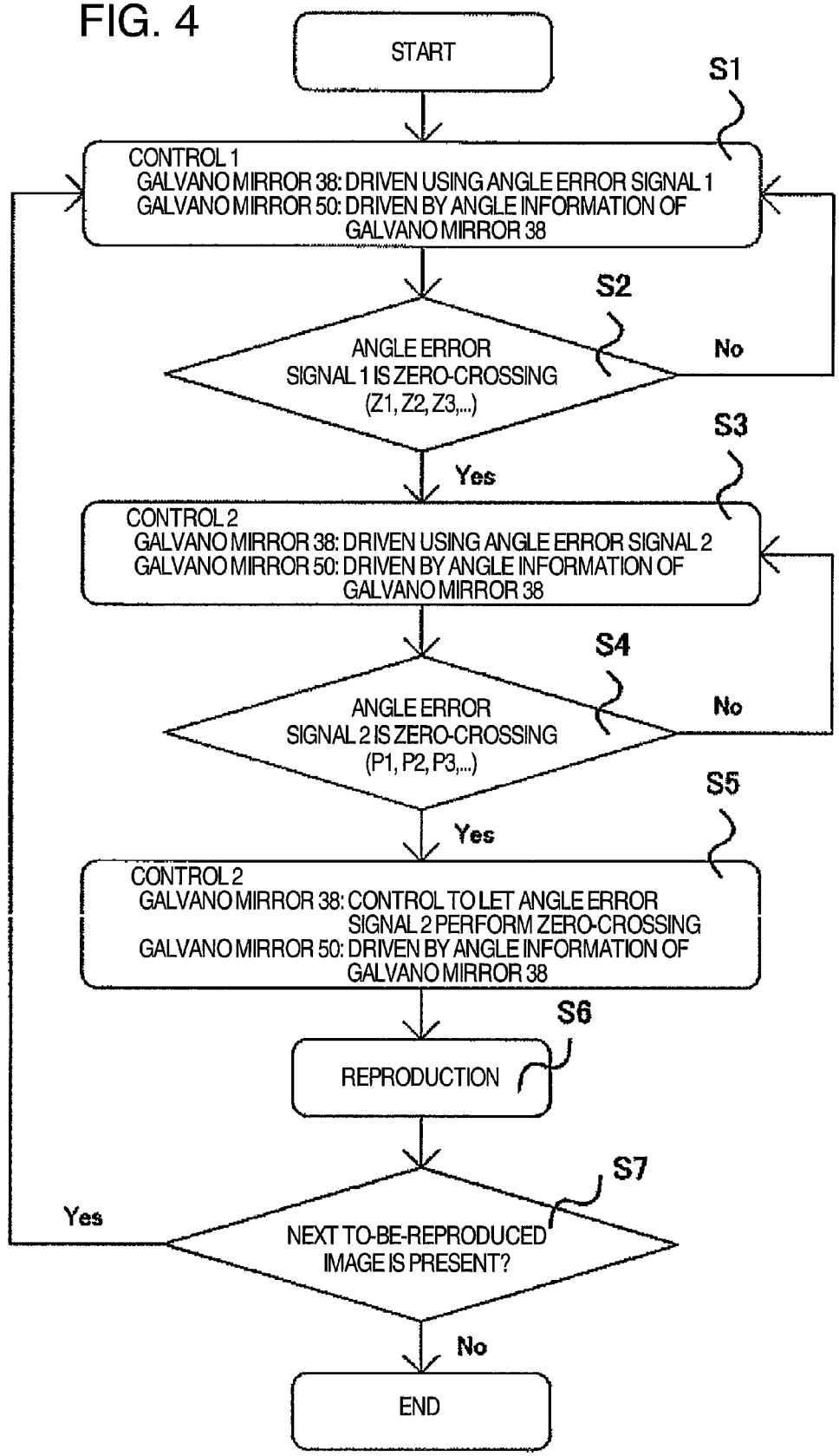
FIG. 4 is a diagram showing a flowchart relating to angular control of the galvano mirror in the embodiment 1.

FIG. 4 shows a flowchart concerning angular control of the galvano mirrors 38 and 50 in the case of reproduction of the same region on the optical information storage medium 300. An explanation will be given below in order of steps.

(S1) Using the angle error signal 1, the galvano mirror 38 is driven.

Based on the galvano mirror 38's angle information, the galvano mirror 50 is driven.

(S2) It is ascertained that the angle error signal 1 performs zero-crossing.

(S3) Using angle error signal 2, the galvano mirror 38 is driven.

Based on the galvano mirror 38's angle information, the galvano mirror 50 is driven.

(S4) It is verified that the angle error signal 2 performs zero-crossing.

(S5) The galvano mirror 38 is controlled so that the angle error signal 2 performs zero-crossing.

By the angle method of galvano mirror 38, the galvano mirror 50 is driven.

(S6) An image is detected, and then recovered.

(S7) Verification is done to determine whether the next image is present.

Figure 5:
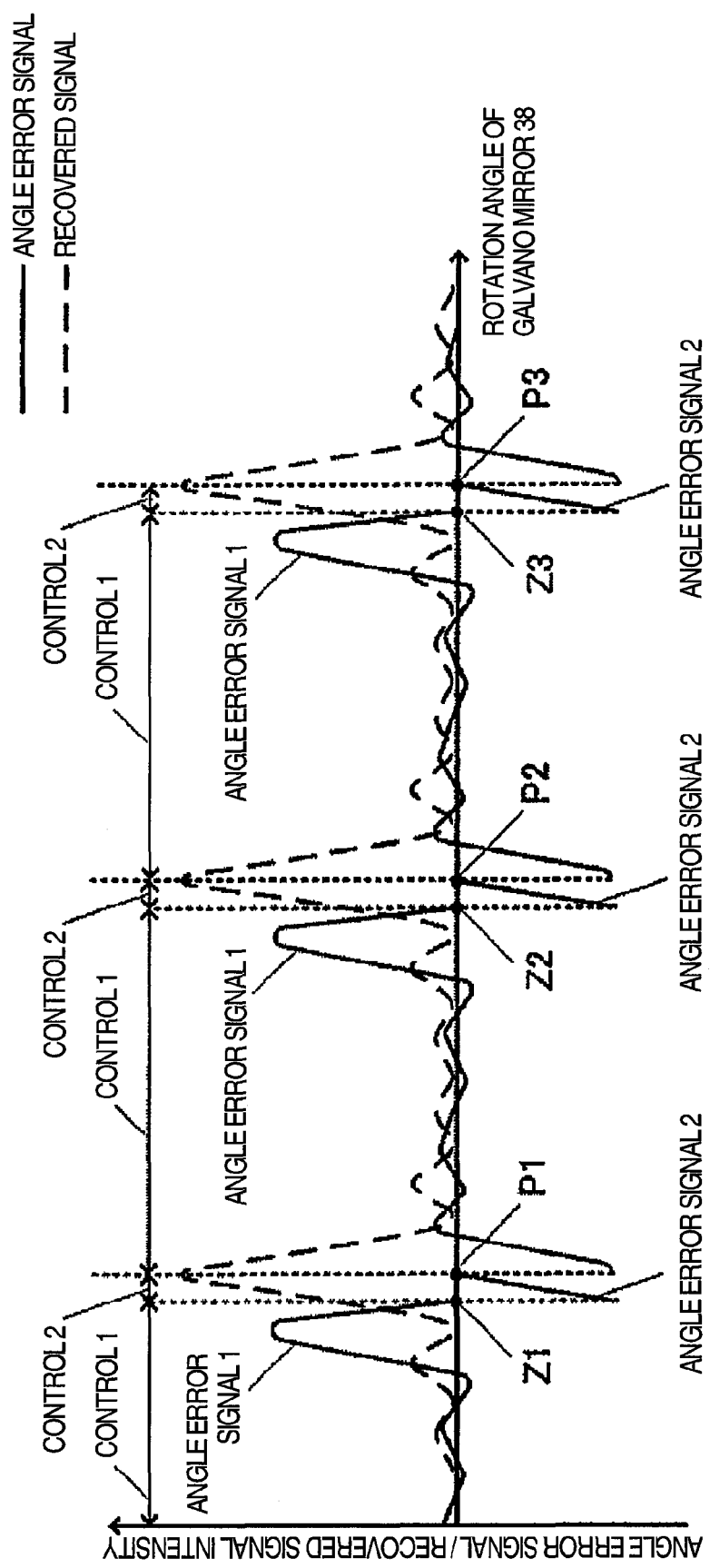
FIG. 5 is a diagram showing an angle error signal in the embodiment 1.

FIG. 5 shows the signal intensity of a recovered signal and that of an angle error signal for a rotation angle in the case of driving the galvano mirror 38 in the flow of FIG. 4. As shown in FIG. 5, in this embodiment, it becomes possible to perform stable reproduction by controlling using the angle error signal 1 and also by switching it to the angle error signal 2 at an angle at which the rotation angle becomes Z1. And, unlike the image detection scheme (Patent Literature 1) such as image sensors, the photodetector that outputs only a light amount and spot position is drivable at high frequency, thus making it possible to detect signals at high speeds. In addition, the rotation angle of galvano mirror is controllable while simultaneously maximizing the recovered light amount; thus, high-quality recovered signals are obtainable. Furthermore, this embodiment method is robust against disturbance during recording, because it detects diffracted beams.

As has been stated above, the hologram recording/reproducing device of this embodiment is characterized by controlling the angle-variable element typically comprising a galvano mirror by using two angle error signals—i.e., an angle error signal using a diffracted beam and that of the angle-variable element such as galvano mirror—while selectively switching therebetween. Another feature lines in producing the angle error signal(s) by using the light axis split element, typically, Wollaston prism, to split the reference beam into two light beams which are different in propagation direction and polarization from each other and perform detection.

Figure 6:
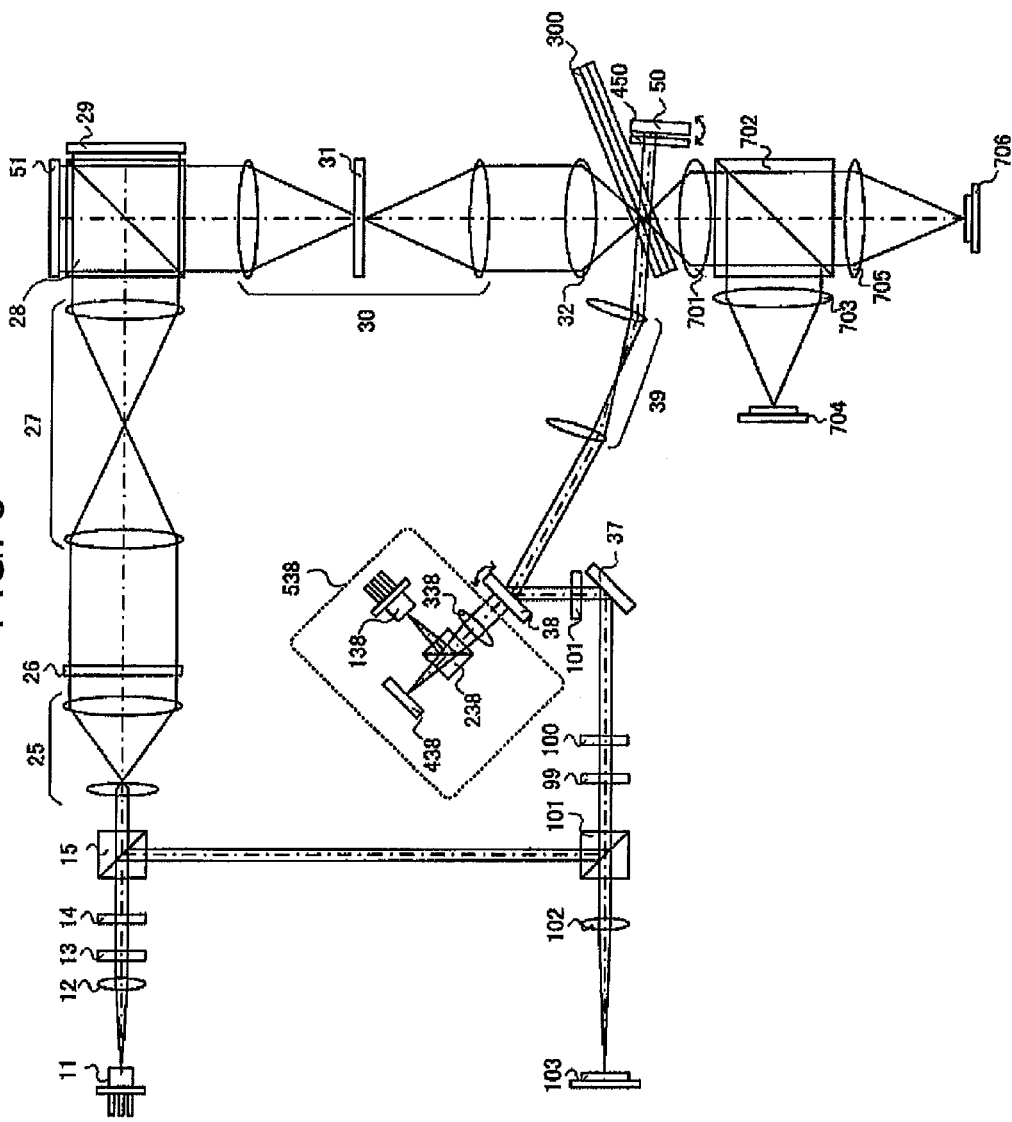
FIG. 6 is a diagram for explanation of another optical system in the embodiment 1.

It should be noted that although this embodiment is arranged so that the galvano mirror 50 is controlled based on the angle information computed from a voltage value and/or current value and inputted to the galvano mirror 38, this is not to be construed as limiting the invention. For example, as shown in FIG. 6, another configuration may be employed for detecting by the photodetector 103 via lens 102 an optical beam which has been reflected at the galvano mirror 50 and penetrated the optical information storage medium 300 to thereby generate the angle error signal used for galvano mirror 50. An angle deviation of the optical beam becomes a spot position deviation or displacement on the photodetector 103; so, detecting such spot position makes it possible to generate the angle error signal of galvano mirror 50.

Note that although the galvano mirror 50 was applied the same control both in control 1 and in control 2, this invention is not limited thereto. For instance, another configuration may be employed, which is arranged so that the galvano mirror 50 is controlled, in the control 1, based on the angle information computed from the voltage value and/or current value and inputted to the galvano mirror 38 and the angle information obtainable from the optics 538 and, in the control 2, fixed by the final control angle (Z1) of control 1. With this arrangement, the element to be driven becomes only one (galvano mirror 38) for a given length of time; thus, there is an advantage of enabling achievement of further speed-up.

Figure 7:
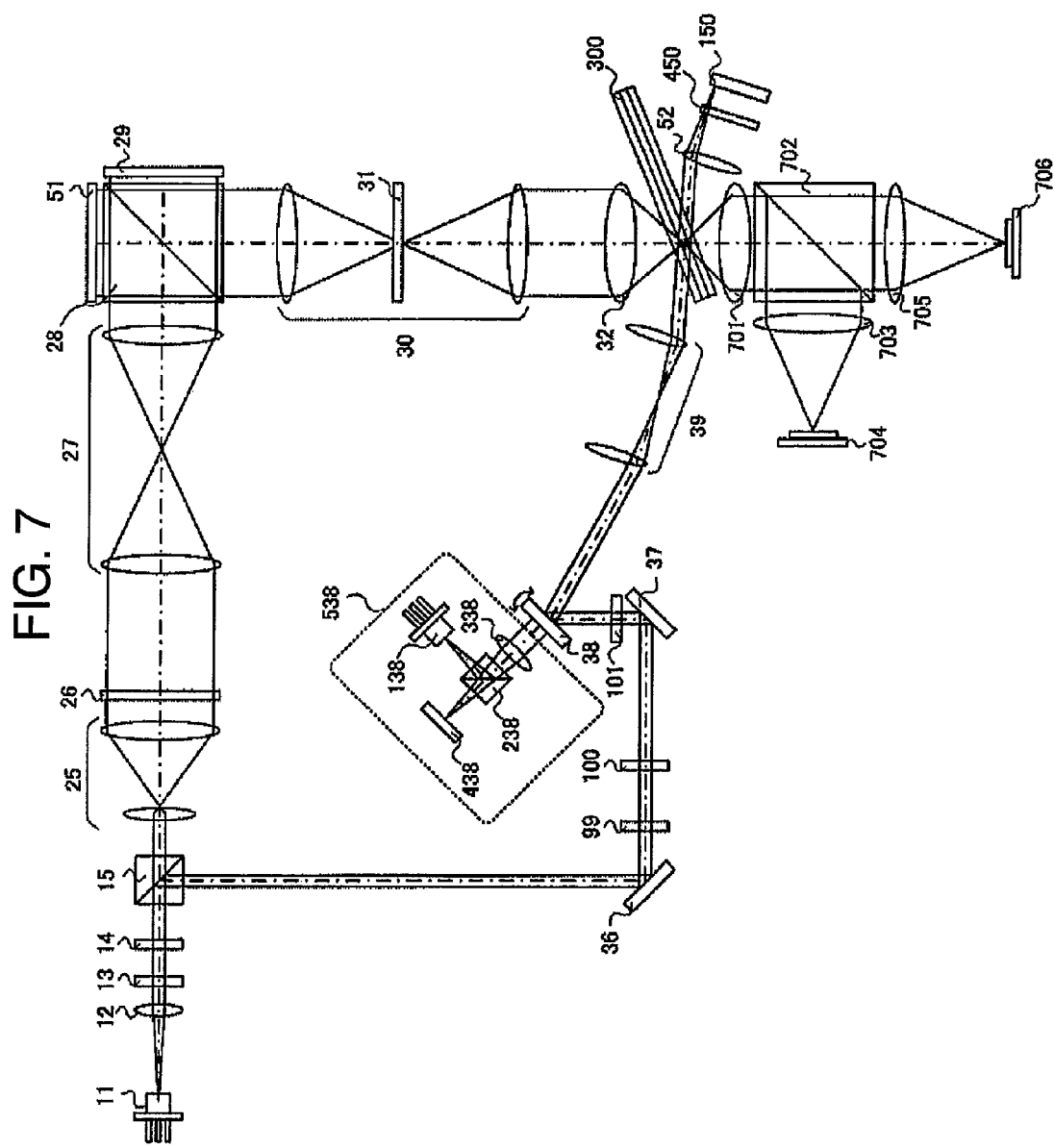
FIG. 7 is a diagram for explanation of another optical system in the embodiment 1.

Also note that although the galvano mirror 50 was controlled to cause inversion in direction of the incident light beam and reflected light beam, this may be modified to use a mirror 150 which fixes a lens 52 as shown in FIG. 7. With this arrangement, it is possible to reduce the component to be driven (galvano mirror 50); so, there is a merit of enabling achievement of further speed-up.

Also note that although in this embodiment the angle deviation amount of P1 and Z2 (P2 and Z2; P3 and Z3) was explained to be about $\phi/2$, it can sometimes change depending on light amounts and signal gains. In this case, the angle error signal 2 may be used to perform driving in conformity with learning or pre-calculated results at the hologram device.

Embodiment 2

Figure 8:
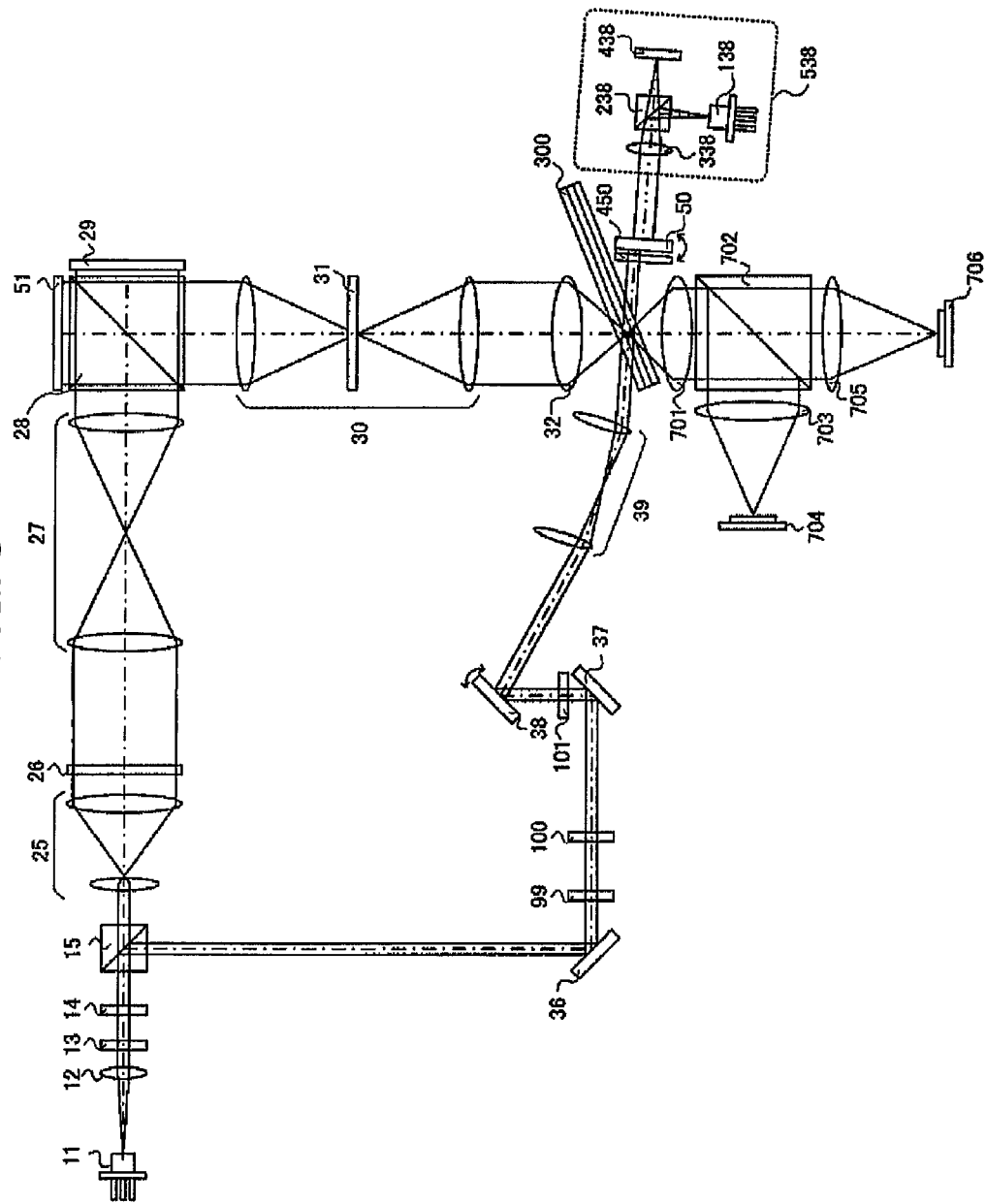
FIG. 8 is a diagram for explanation of an optical system in an embodiment 2.

FIG. 8 shows an optical system of optical pickup device in a hologram recording/reproducing device of the type using two-beam angular multiplexing technique in accordance with a second embodiment of this invention. Its difference from the embodiment 1 is that the galvano mirror 50 is associated with built-in optics 538 for generating angle error signal 2. Those except this are the same as corresponding ones of the embodiment 1; so, in this embodiment, an explanation will be given of an angle control method of galvano mirror 38, 50, which is different from that of the embodiment 1.

Figure 9:
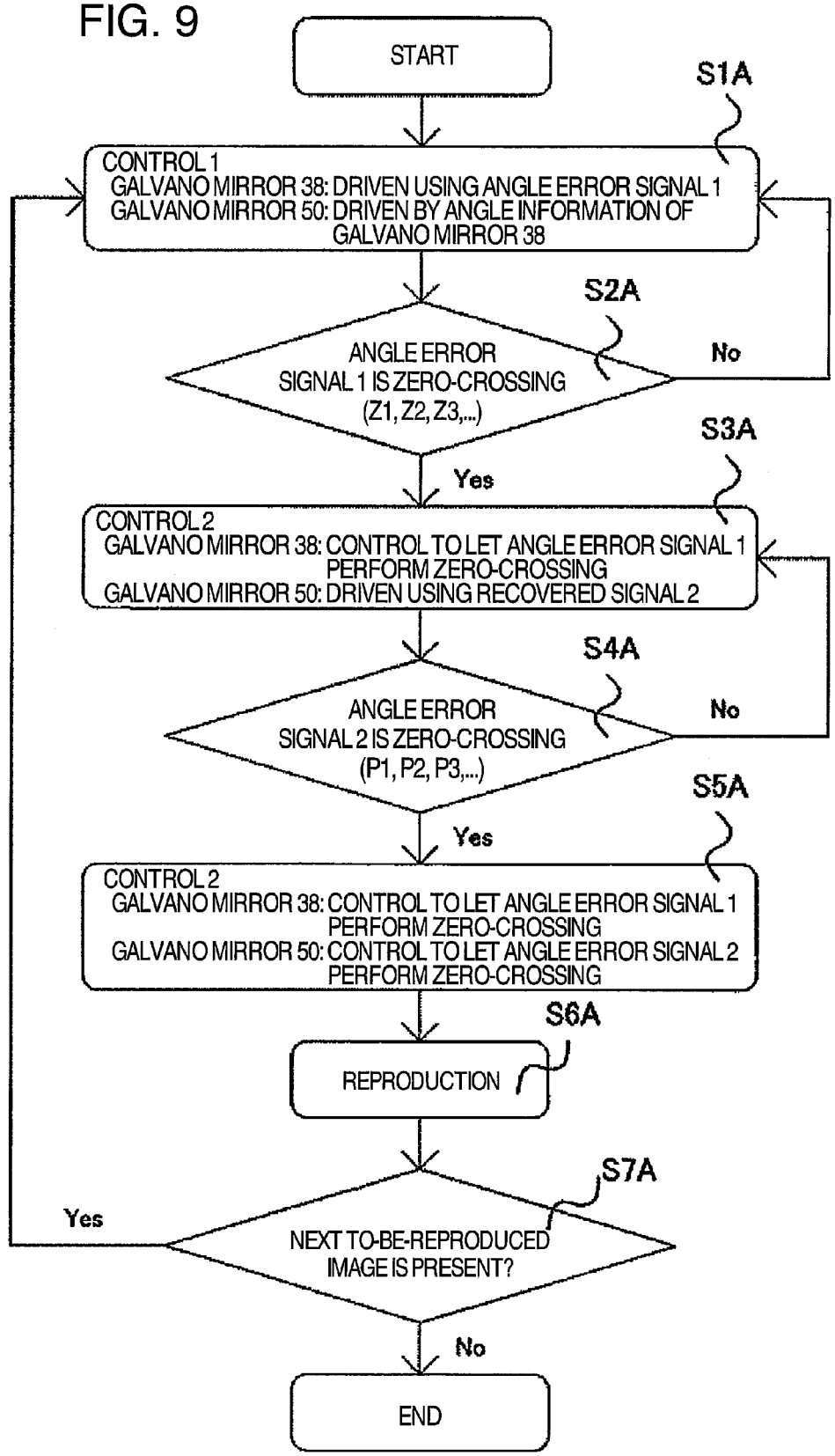
FIG. 9 is a diagram showing a flowchart relating to angular control of a galvano mirror in the embodiment 2.

FIG. 9 shows a flowchart concerning the angle control of galvano mirror 38, 50 in the case of reproduction of the same region on optical information storage medium 300. An explanation will be given below in order of steps.

(S1A) Using an angle error signal 1, the galvano mirror 38 is driven.

Based on the angle information of galvano mirror 38, the galvano mirror 50 is driven.

(S2A) It is made sure that the angle error signal 1 performs zero-crossing.

(S3A) Galvano mirror 38 is controlled so that angle error signal 1 performs zero-crossing.

Using the angle error signal 2, the galvano mirror 50 is driven.

(S4A) It is verified that angle error signal 2 performs zero-crossing.

(S5A) The galvano mirror 38 is controlled so that angle error signal 1 performs zero-crossing.

The galvano mirror 50 is controlled so that angle error signal 2 performs zero-crossing.

(S6A) An image is detected and recovered.

(S7A) Checking whether the next image is present.

For the embodiment 1, it is also possible to perform stable reproduction by switching the angle error signal for control of galvano mirror 50 in the way stated above.

As has been stated above, the hologram recording/reproducing device of this embodiment is characterized by controlling the angle-variable element typically comprising a galvano mirror by using two angle error signals—i.e., an angle error signal using a diffracted beam and that of the angle-variable element such as galvano mirror—while selectively switching therebetween. Another feature lines in producing the angle error signal(s) by using the light axis split element, typically, Wollaston prism, to split the reference beam into two light beams which are different in propagation direction and polarization from each other and perform detection.

Note here that although in this embodiment the galvano mirror 38 was controlled at the time of control 2, it may alternatively be fixed. By doing so, the element to be driven becomes only one (galvano mirror 50) for a given length of time; thus, there is an advantage of making it possible to achieve further speed-up.

Embodiment 3

Figure 10:
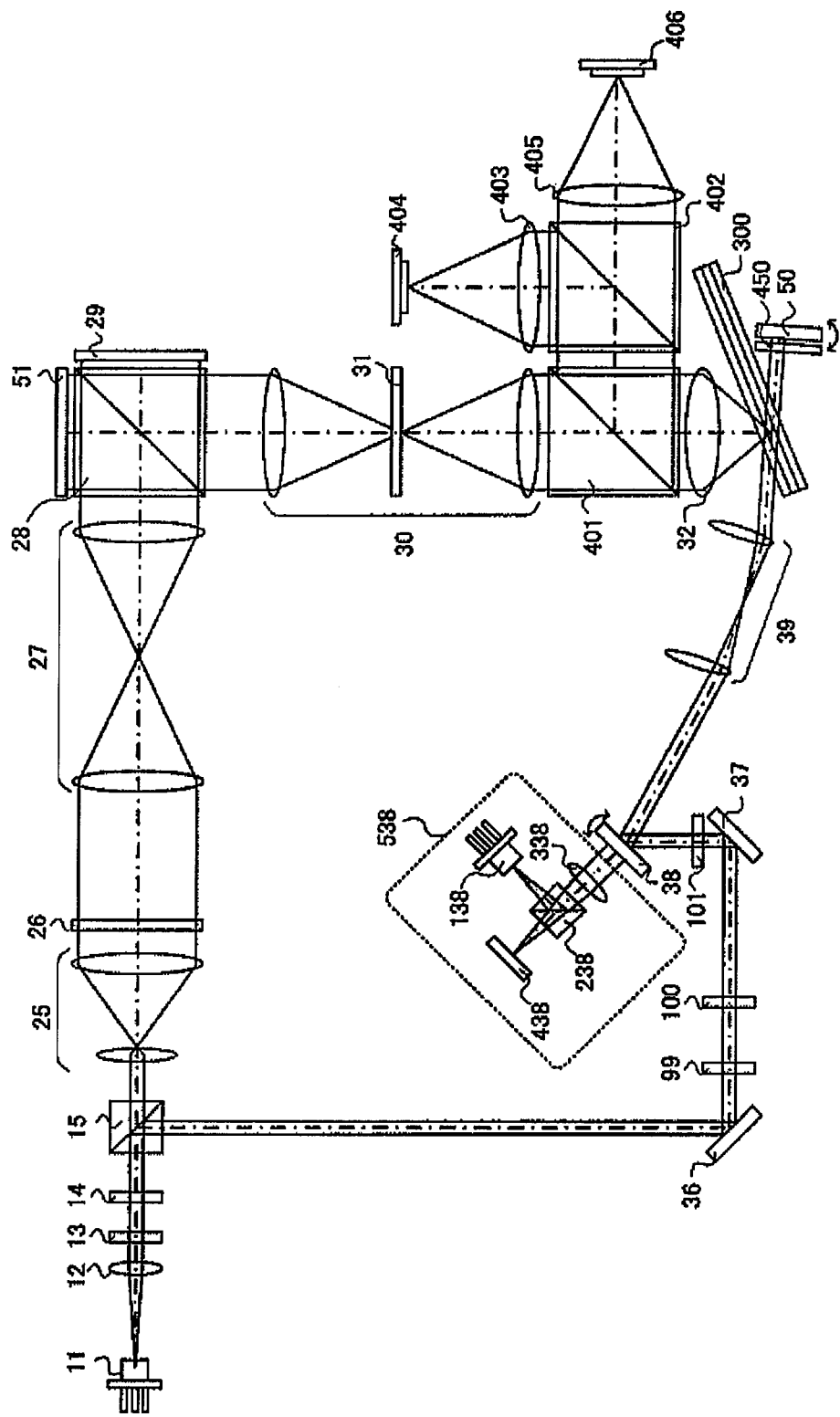
FIG. 10 is a diagram for explanation of an optical system in an embodiment 3.

FIG. 10 shows an optical system of optical pickup device in a hologram recording/reproducing device of the type using two-beam angular multiplexing technique in accordance with a third embodiment of this invention. The embodiment 1 is arranged to detect the angle error signal by detection of a light beam being incident to optical information storage medium 300 after reflection at the galvano mirror 38. In contrast, this embodiment is constitutively characterized by detecting the angle error signal by detection of a light beam being incident to optical information storage medium 300 after reflection at the galvano mirror 50. With such arrangement, this embodiment becomes more advantageous than the embodiment 1 in viewpoints of downsizing and disturbance withstandability.

Using FIG. 10, the reproducing method's different points from the embodiment 1 will be explained. The reference beam reflected off at galvano mirror 38 in a similar way to the embodiment 1 travels through scanner lens 39, optical information storage medium 300 and ¼ wavelength plate 450 to enter galvano mirror 50 (second angle-variable element). The galvano mirror 50 is being controlled so that the incoming reference beam becomes approximately perpendicular to galvano mirror 50 based on the angle information computed from the voltage value and/or current value and inputted to galvano mirror 38 and the angle information obtainable from optics 538. Then, two incident light beams penetrate ¼ wavelength plate 450 again. Here, since the penetration of ¼ wavelength plate 450 was done before and after reflection at galvano mirror 38, the polarization is converted, resulting in the reference beam becoming a P-polarized beam and the control beam becoming an S-polarized beam.

The two light beams that penetrated the ¼ wavelength plate 450 behave to fall on optical information storage medium 300. Then, by the reference beam and control beam, reproduced or "recovered" light (a diffracted beam of the reference beam) having certain information and a diffracted beam of the control beam are produced from the recording region in the direction of objective lens 32.

These diffracted beams enter a prism 401 via objective lens 32. The prism 401 has polarization characteristics, wherein a P-polarized beam is 90% in transmissivity and 10% in reflectivity whereas an S-polarized beam is 0% in transmissivity and 100% in reflectivity.

Here, the diffracted beam generated at optical information storage medium 300 is the same in polarization as the incident polarized beam; so, the prism 401 permits transmission of 90% of the recovered light derived from the reference beam and reflection of 10% thereof. Regarding the diffracted beam derived from the control beam, prism 401 reflects 100% of it. Here, two light beams reflected at prism 401 enter PBS prism 402. At this time, the recovered light penetrates PBS prism; the diffracted beam derived from the control beam is reflected at PBS prism. Then, these diffracted beams travel through detection lenses 403 and 405 to enter the photosensitive parts of photodetectors 404 and 406, respectively.

Here, letting a signal obtained at photodetector 404 be S1 and a signal obtained at photodetector 406 be S2, the angle error signal 1 (AES1) is given as:

$$AES1=S1-S2. \qquad \text{[MATH. 1]}$$

Note that the signal S1, S2 is a total sum signal with detection of an entire light amount of its corresponding diffracted beam.

On the other hand, the recovered light that penetrated PBS prism 401 enters the imaging element 51 through relay lens 30, spatial filter 31 and PBS prism 28. And, based on the recovered light falling on imaging element 51, recovered image data is generated.

Next, the galvano mirror 38 is rotation-controlled using the angle error signal 1 and the angle error signal 2 obtained from optics 538, thereby varying the angle of incidence of the reference beam to optical information storage medium 300. This results in production of angle-multiplexed recovered image data within optical information storage medium 300.

Additionally a difference of this embodiment from embodiment 1 is a different of the layout of the optics for detecting angle error signal 1; the angle error signal detection method per se is the same. Thus, the detection is executable for the same reason as the embodiment 1. The flowchart concerning the angular control of galvano mirror 38 and galvano mirror 50 also is the same as that of embodiment 1.

This embodiment offers its advantage of an ability to obtain high resistance to disturbance owing to the layout in the same direction as the recovered light. The reason of this will be explained below.

In angle-multiplex recording methodology, the diffracted beam intensity is also deteriorated due to inclination or tilting of the optical information storage medium 300 to an angle in a direction approximately perpendicular to the angle-multiplex recording direction. Consequently, in the embodiment 1 and this embodiment, angle correction element 101 is disposed. This angle correction element 101 has a merit of being able to control faster, with higher accuracy, than controlling the attitude of optical information storage medium. Note however that in the case of embodiment 1, there is a problem that an increase in correction quantity of angle correction element 101 leads to degradation of signal performances.

FIG. 11 shows illustrations in the vertical direction of FIG. 1 (or FIG. 8). Optical beams 55, 60 shown herein indicate the propagation directions of the light beams; the diffracted beams 55D, 60D pictorially indicate the diffracted beams at the time of incidence of the optical beams 55, 60. Note that part (a) shows the case of the optical information storage medium 300 being not tilted; part (b), (c) indicates the case where optical information storage medium 300 is tilted in the direction perpendicular to the angle-multiplex recording direction. Additionally, (b) and (c) are different from each other in inclination of an optical beam with respect to optical information storage medium 300 before and after incidence to galvano mirror 50.

Here, in the case of (a), the inclination of the light beam with respect to optical information storage medium 300 before the incidence to galvano mirror 50 is the same (perpendicular) as that after the incidence thereto; so, the diffracted beams 55D, 60D are generated significantly. In contrast, in the case of (b), (c), it is not possible to enlarge both of the light intensity of diffracted beam 55D and that of diffracted beam 60D at a time because unwanted tilting of optical information storage medium 300 merely permits the inclination of optical beam with respect to optical information storage medium 300 before and after incidence of galvano mirror 50 to be set to only either one. Usually, the light amount of recovered light is enlarged in consideration of reproduction performances; so, in the case of embodiment 1, detection light used for the angle error signal becomes smaller undesirably. While the angle error signal 1 of the embodiment 1 ensures that a certain degree of performance is obtainable by electrically amplifying it; however, in the case of performing detection in the same direction as recovered light as in this embodiment, there is an advantage of being able to obtain a more stable angle error signal(s). Although an attempt may be made to change the inclination of optical information storage medium 300, it is more advantageous to drive the angle correction element in terms of the speed.

And, even when using a wave surface aberration correction technique such as indicated, for example, in Non-Patent Literature 1 (International Symposium on Optical Memory 2012, Mo-C-01), the configuration of this embodiment is more advantageous than the embodiment 1 since a change occurs undesirably in wave surface with respect to the optical information storage medium 300 before and after the incidence to galvano mirror 50.

As has been stated above, the hologram recording/reproducing device of this embodiment is characterized by controlling the angle-variable element—typically, galvano mirror—by means of two angle error signals including the angle error signal using the diffracted beam and that of the angle-variable element—typically, galvano mirror—while simultaneously performing switching between these signals. Another feature is that angle error signal generation is performed by causing the light axis slit element, typically, Wollaston prism, to slit the reference beam into two optical beams which are different in propagation direction and in polarization from each other and then perform detection thereof. A further feature of this embodiment is that more stable control can be provided since the angle error signal 1 is generated using the diffracted beam produced in the same direction of recovered light.

Figure 12:
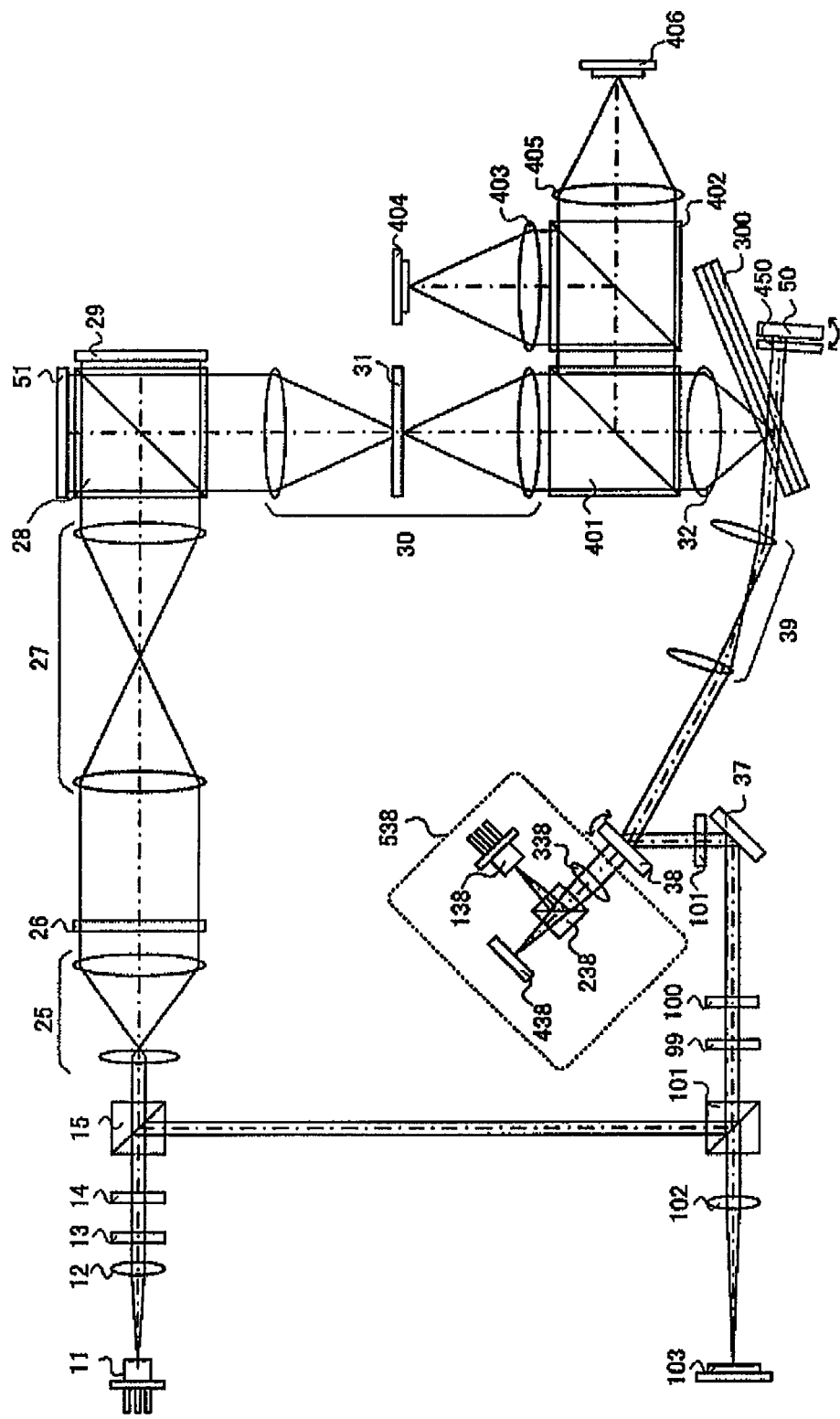
FIG. 12 is a diagram for explanation of another optical system in the embodiment 3.

It is noted that although in this embodiment the galvano mirror 50 is arranged to be controlled based on angle information computed from the voltage value and/or current value and inputted to galvano mirror 38, this is not to be construed as limiting the invention. For example, as shown in FIG. 12, another configuration may be employed which detects the optical beam that was reflected at galvano mirror 50 and passed through optical information storage medium 300 by photodetector 103 through lens 102 to thereby generate the angle error signal for galvano mirror 50. As the optical beam's angle deviation becomes a spot position deviation on photodetector 103, detection of such position makes it possible to generate the angle error signal.

Although the galvano mirror 50 is applied the same control in the control 1 and control 2, this invention is not limited thereto. For instance, the galvano mirror 50 may alternatively be controlled based on the angle information computed from the voltage/current value and inputted to galvano mirror 38 in the control 1 and, in the control 2, fixed to the final control angle (Z1) of the control 1. With this approach, the element is to be driven becomes only one (galvano mirror 38) for a given length of time, thereby offering an advantage of enabling further speed-up.

Figure 13:
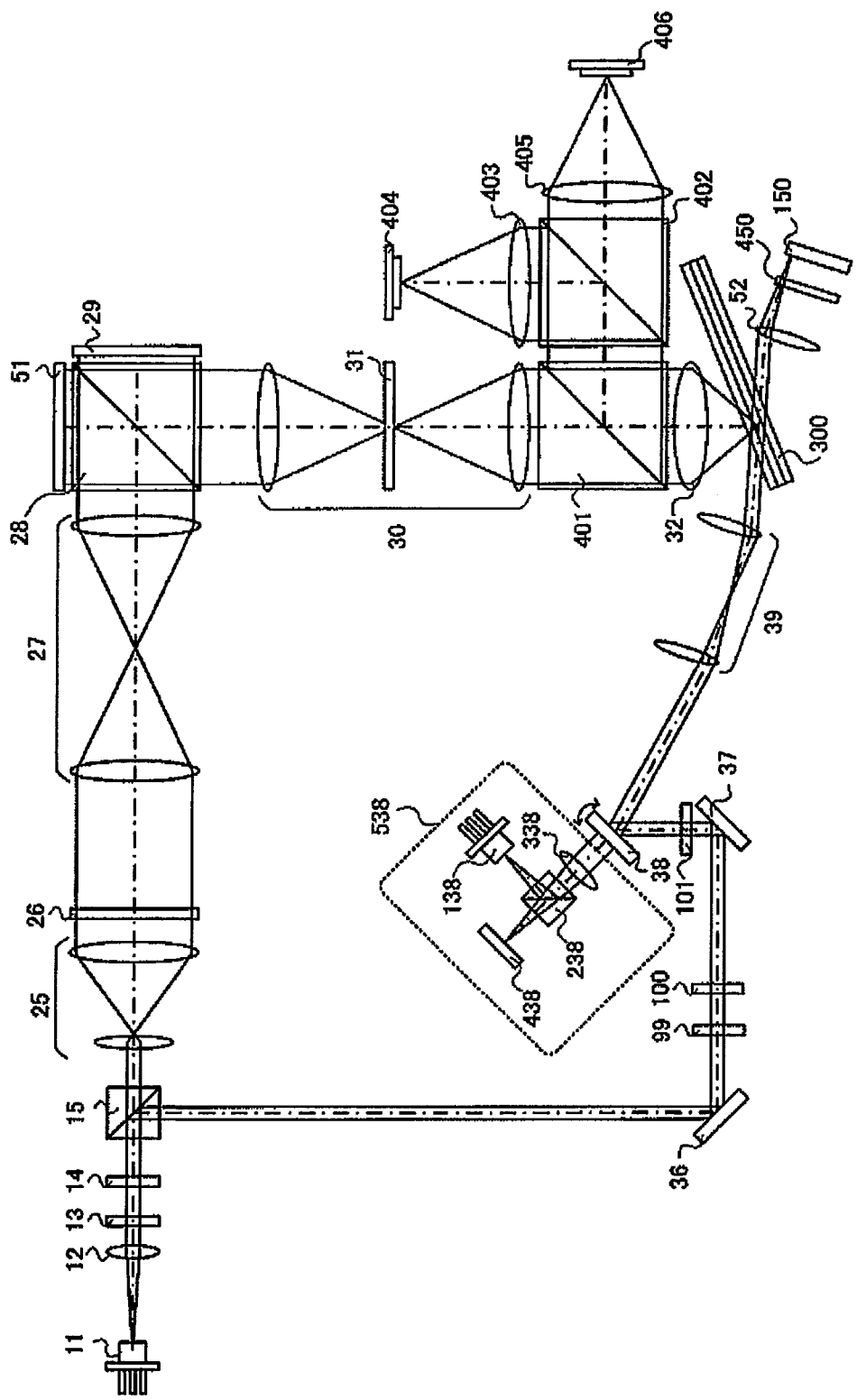
FIG. 13 is a diagram for explanation of another optical system in the embodiment 3.

Also note that although the galvano mirror 50 of this embodiment was controlled in such a way that the incident light beam and the reflected light beam are inverted in direction, another arrangement may be employed which uses a mirror 150 that fixes lens 52 to achieve the inversion as shown in FIG. 13 for example. With this arrangement, it is possible to reduce the drive component (galvano mirror 50); thus, there is an advantage of enabling achievement of further speed-up.

Embodiment 4

Figure 14:
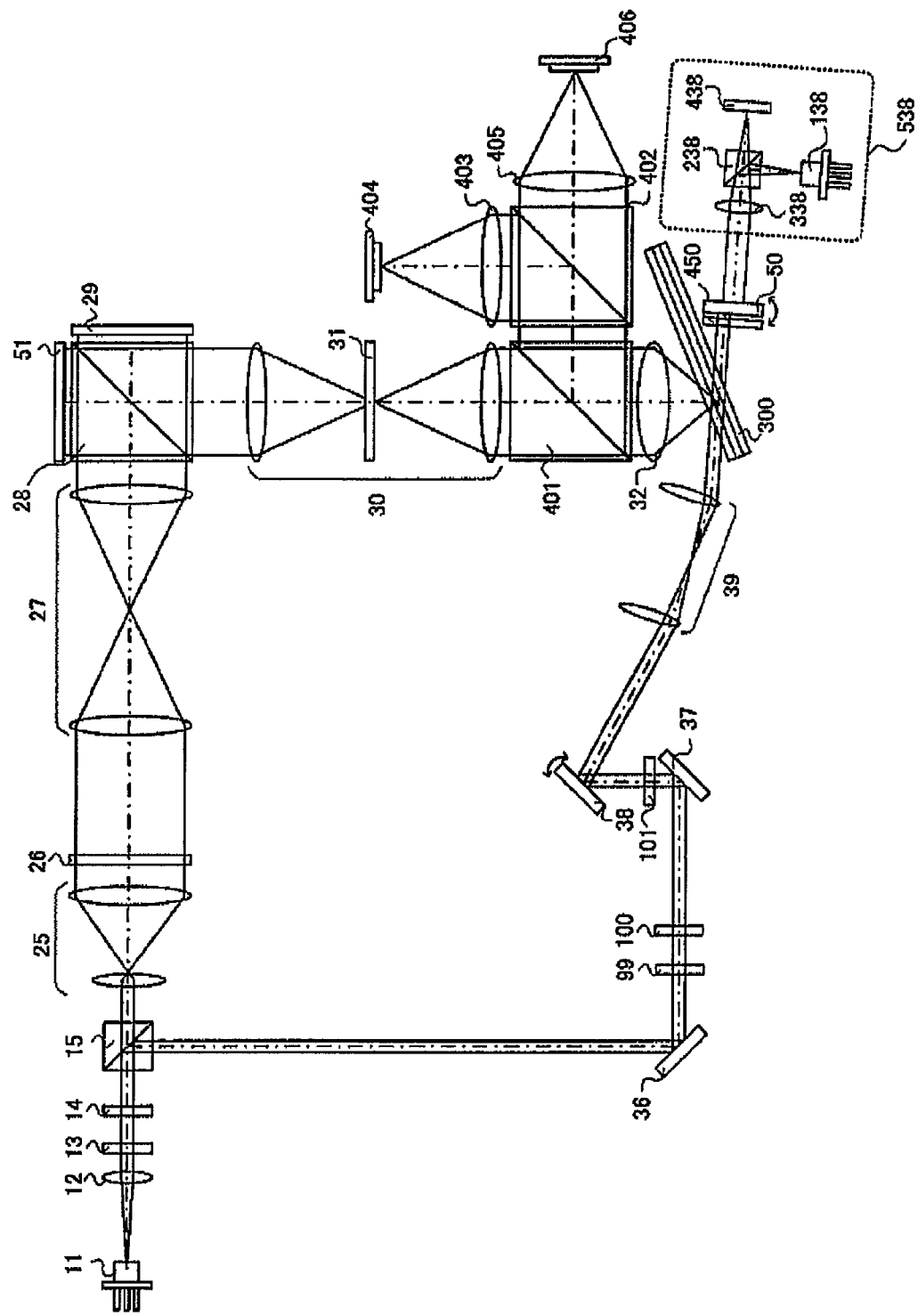
FIG. 14 is a diagram for explanation of an optical system in an embodiment 4.

FIG. 14 is the one that shows an optical system of optical pickup device in a two-beam angle-multiplex hologram recording/reproducing device in accordance with a fourth embodiment of this invention. Its difference from the embodiment 3 is that the optics 538 for generating the angle error signal 2 is built in galvano mirror 50. The others are the same as those of embodiment 1; so, in this embodiment, an explanation will be given of an angle control method of galvano mirror 38, 50 different from the embodiment 3.

FIG. 9 shows a flowchart concerning the angle control of galvano mirror 38, 50 in the case of reproduction of the same region on optical information storage medium 300. An explanation will be set forth below in order of steps.

(S1A) Using an angle error signal 1, the galvano mirror 38 is driven.

By the angle method of galvano mirror 38, the galvano mirror 50 is driven.

(S2A) It is made sure that the angle error signal 1 performs zero-crossing.

(S3A) Galvano mirror 38 is controlled so that angle error signal 1 performs zero-crossing.

Using the angle error signal 2, the galvano mirror 50 is driven.

(S4A) It is verified that angle error signal 2 performs zero-crossing.

(S5A) Galvano mirror 38 is controlled so that angle error signal 1 performs zero-crossing.

Galvano mirror 50 is controlled so that angle error signal 2 performs zero-crossing.

(S6A) An image is detected and recovered.

(S7A) Checking whether the next image is present.

For the embodiment 1, it also becomes possible to perform stable reproduction by switching the angle error signal for control of galvano mirror 50 in the way stated above.

As has been stated above, the hologram recording/reproducing device of this embodiment is characterized by controlling the angle-variable element typically comprising a galvano mirror by using two angle error signals—i.e., an angle error signal using a diffracted beam and that of the angle-variable element such as galvano mirror—while selectively switching therebetween. Another feature lines in producing the angle error signal(s) by using the light axis split element, typically, Wollaston prism, to split the reference beam into two light beams which are different in propagation direction and polarization from each other and perform detection. Furthermore, this embodiment is characterized by performing more stable control because the angle error signal 1 is generated by use of the diffracted beam produced in the same direction as the recovered light.

Although in this embodiment the galvano mirror 38 was controlled in the event of control 2, this mirror may alternatively be fixed. By doing so, the element is to be driven becomes only one (galvano mirror 38) for a given length of time, thereby offering an advantage of enabling further speed-up.

Additionally, although in the embodiments 1 to 4 the optics 538 is disposed for measuring a change in mirror angle of the galvano mirror, the galvano mirror angle detection method per se should not be interpreted to be the one that limits the invention because the major feature of this embodiment lies in that control is provided while performing switching between two angle error signals. For example, an output from a rotary encoder in the interior of galvano mirror such as shown in Patent Literature 2 (WO99/54688) may be used.

Furthermore, although the embodiments 1-4 have been explained in terms of the control of galvano mirror 38, 50, this invention is not limited thereto. An alternative configuration is employable, wherein the angle error signal of at least one of a plurality of angle-variable elements is switched and controlled.

In addition, although in the embodiments 1-4 the optical beam propagation direction is varied using the galvano mirror, this may be replaced with another type of angle-variable element, such as for example an acousto-optic element or the like. And, although in the embodiments 1-4 the wedge prism is used to correct the angle in the direction approximately perpendicular to the angle-multiplex recording being applied to optical information storage medium 300, such prism may be replaced by an angle correction element such as galvano mirror for example. Furthermore, although in the embodiment 1-4 it has been explained that changeover between the control 1 and control 2 is done at an angle at which the angle error signal 1 performs zero-crossing, it may also be permissible to perform the changeover at a predetermined angle other than the zero-crossing angle and drive using the angle error signal 2 in a way pursuant to learning and pre-calculation results at the hologram device. And, in the embodiment 1-4, the angle-multiplexed hologram has been described; however, similar results are also obtainable by other systems in view of control signal switching.

It should be noted that this invention is not limited to the illustrative embodiments stated supra, and various modifications and alterations are involved therein. For example, the above-stated embodiments have been described in detail in order to explain the present invention in an easy-to-understand way, and the invention is not exclusively limited to those having all of the above-stated constituent parts or components. Additionally, one part of the configuration of an embodiment is replaceable with the configuration of another embodiment; it is also possible to add to the configuration of an embodiment the configuration of another embodiment. In addition, regarding one part of the configuration of each embodiment, another configuration is addable, deletable and replaceable.

REFERENCE SIGNS LIST

11: Light Source
12: Collimating Lens
13: Shutter
14: Polarization-Variable Element
15: PBS Prism
25: Beam Expander
26: Phase Mask
27: Relay Lens
28: PBS Prism
29: Spatial Light Modulator
30: Relay Lens
31: Spatial Filter
32: Objective Lens
36: Mirror
37: Mirror
38: Galvano Mirror
39: Scanner Lens
50: Galvano Mirror
51: Imaging Element
60: Optical Pickup Device
70: Optical Information Storage Medium Drive Element
82: Light Source Drive Circuit
83: Servo Signal Generation Circuit
84: Servo Control Circuit
85: Signal Processing Circuit
86: Signal Generation Circuit
87: Shutter Control Circuit
88: Position Control Circuit
89: Controller
99: Wavelength Plate
100: Wollaston Prism
101: 138: Light Source
238: Prism
300: Optical Information Storage Medium
338: Collimating Lens
401: PBS Prism
402: Detection Lens
403: Photodetector
404: Photodetector
405: Detection Lens
406: Photodetector
438: Photodetector
450: ¼ Wavelength Plate
512: Phase Conjugation Optics
513: Optical Information Storage Medium Cure Optics
514: Optical Information Storage Medium Position Detection Optics
538: Optics
701: Lens
702: PBS Prism
703: Detection Lens
704: Photodetector
705: Detection Lens
706: Photodetector.

The invention claimed is:

1. A hologram recording and reproducing device which records information by applying a signal beam and a reference beam to an optical information storage medium to record a hologram therein and reproduces the information by applying a reference beam to the hologram recorded in the optical information storage medium, the device comprising:
  a light source which emits an optical beam;
  a splitting unit which splits the optical beam into the signal beam and the reference beam;
  a light axis splitting unit which splits the reference beam into a first light beam and a second light beam having different propagation directions;
  an angle adjustment unit for varying an angle of incidence of the first light beam and the second light beam incident on the optical information storage medium;
  an angle detection unit for measuring the angle of incidence varied by the angle adjustment unit,
  a spatial light modulation unit for adding the information to the signal beam;

an objective lens for casting the signal beam onto the optical information storage medium;

an imaging unit for detecting a recovered beam including the information generated from the hologram recorded in the optical information storage medium when casting the first light beam and the second light beam onto the optical information storage medium; and at least one detection unit for generating a first angle error signal and a second angle error signal for controlling the angle adjustment unit, wherein the at least one detection unit is different from the imaging unit, and the first angle error signal is generated from the at least one light detection unit detecting a first diffracted beam and a second diffracted beam from the hologram when casting the first light beam and the second light beam onto the optical information storage medium, the first diffracted beam and the second diffracted beam corresponding to the first light beam and the second light beam, wherein the second angle error signal is generated from the at least one detection unit based on the measured angle of incidence of the angle detection unit, wherein the angle adjustment unit varies the angle of incidence of the first light beam and the second light beam incident on the optical information storage medium according to the first angle error signal and thereafter switches to vary the angle of incidence of the first light beam and the second light beam incident on the optical information storage medium according to the second angle error signal.

2. The hologram recording/reproducing device according to claim 1, wherein the first light beam is perpendicular in polarization to the second light beam.

3. The hologram recording/reproducing device according to claim 2, wherein a difference between zero-crossing angles of the first angle error signal and the second angle error signal is approximately $\phi/2$ when the propagation directions of the first light beam and the second light beam are different by an angle $\phi$.

4. The hologram recording/reproducing device according to claim 3, wherein the angle adjustment unit varies the angle of incidence of the first light beam and the second light beam incident on the optical information storage medium according to the first angle error signal and thereafter switches when the first angle error signal becomes a prescribed value.

5. The hologram recording/reproducing device according to claim 3, wherein the angle adjustment unit varies the angle of incidence of the first light beam and the second light beam incident on the optical information storage medium according to the first angle error signal and thereafter switches when the first angle error signal becomes zero.

6. The hologram recording/reproducing device according to claim 5, wherein the angle adjustment unit varies the angle of incidence of the first light beam and the second light beam incident on the optical information storage medium according to the second angle error signal and thereafter switches to vary the angle of incidence of the first light beam and the second light beam incident on the optical information storage medium according to the first angle error signal when the second angle error signal becomes a prescribed value.

7. The hologram recording/reproducing device according to claim 6, wherein the angle adjustment unit varies the angle of incidence of the first light beam and the second light beam incident on the optical information storage medium according to the second angle error signal and thereafter switches to vary the angle of incidence of the first light beam and the second light beam incident on the optical information storage medium according to the first angle error signal when reproduction of the information generated from the hologram at a prescribed angle of the first light beam and the second light beam completes.

8. A hologram recording and reproducing device which records information by applying a signal beam and a reference beam to an optical information storage medium to record a hologram therein and reproduces the information by applying a reference beam to the hologram recorded in the optical information storage medium, the device comprising:

a light source which emits an optical beam;

a splitting unit which splits the optical beam into the signal beam and the reference beam;

a light axis splitting unit which splits the reference beam into a first light beam and a second light beam having different propagation directions, and where the first light beam is perpendicular in polarization to the second light beam;

an angle adjustment unit for varying an angle of incidence of first light beam and the second light beam incident on the optical information storage medium;

an angle detection unit for measuring the angle of incidence varied by the angle adjustment unit, a spatial light modulation unit for adding the information to the signal beam;

an objective lens for casting the signal beam onto the optical information storage medium;

an imaging unit for detecting a recovered beam including the information generated from the hologram recorded in the optical information storage medium when casting the first light beam and the second light beam onto the optical information storage medium; and at least one detection unit for generating a first angle error signal and a second angle error signal for controlling the angle adjustment unit, wherein the at least one detection unit includes a light detection unit different from the imaging unit, and the first angle error signal is generated from the light detection unit detecting a first diffracted beam and a second diffracted beam from the hologram when casting the first light beam and the second light beam onto the optical information storage medium, the first diffracted beam and the second diffracted beam corresponding to the first light beam and the second light beam, wherein the second angle error signal is generated from the at least one detection unit based on the measured angle of incidence of the angle detection unit, wherein the angle adjustment unit varies the angle of incidence of the first light beam and the second light beam incident on the optical information storage medium according to the first angle error signal and thereafter switches to vary the angle of incidence of the first light beam and the second light beam incident on the optical information storage medium according to the second angle error signal.

9. The hologram recording/reproducing device according to claim 8, wherein a difference between zero-crossing angles of the first angle error signal and the second angle error signal is approximately $\phi/2$ when the propagation directions of the first light beam and the second light beam are different by an angle $\phi$.

10. The hologram recording/reproducing device according to claim 8, wherein the angle adjustment unit varies the angle of incidence of the first light beam and the second light beam incident on the optical information storage medium according to the first angle error signal and thereafter switches when the first angle error signal becomes a prescribed value.

11. The hologram recording/reproducing device according to claim 10, wherein the angle adjustment unit varies the angle of incidence of the first light beam and the second light beam incident on the optical information storage medium according to the first angle error signal and thereafter switches when the first angle error signal becomes zero.

12. The hologram recording/reproducing device according to claim 11, wherein the angle adjustment unit varies the angle of incidence of the first light beam and the second light beam incident on the optical information storage medium according to the second angle error signal and thereafter switches to vary the angle of incidence of the first light beam and the second light beam incident on the optical information storage medium according to the first angle error signal when the second angle error signal becomes a prescribed value.

13. The hologram recording/reproducing device according to claim 12, wherein the angle adjustment unit varies the angle of incidence of the first light beam and the second light beam incident on the optical information storage medium according to the second angle error signal and thereafter switches to vary the angle of incidence of the first light beam and the second light beam incident on the optical information storage medium according to the first angle error signal when reproduction of the information generated from the hologram at a prescribed angle of the first light beam and the second light beam completes.

14. A hologram recording and reproducing device which records information by applying a signal beam and a reference beam to an optical information storage medium to record a hologram therein and reproduces the information by applying a reference beam to the hologram recorded in the optical information storage medium, the device comprising:
 a light source which emits an optical beam;
 a beam splitter disposed to split the optical beam from the light source into the signal beam and the reference beam;
 a polarizing beam splitter disposed to split the reference beam from the beam splitter into a first light beam and a second light beam having different propagation directions and different polarizations;
 an angle adjustment unit including at least one galvano mirror disposed to vary an angle of incidence of the first light beam and the second light beam incident on the optical information storage medium;
 an angle detection unit including optics disposed to measure the angle of incidence varied by the angle adjustment unit,
 a spatial light modulator disposed to add the information to the signal beam from the beam splitter;
 an objective lens disposed to cast the signal beam from the spatial light modulator onto the optical information storage medium;
 an imaging unit including a first photodetector to detect a recovered beam including the information generated from the hologram recorded in the optical information storage medium when casting the first light beam and the second light beam onto the optical information storage medium; and
 a detection unit including a second photodetector and a third photodetector disposed to generate a first angle error signal, and including a fourth photodetector disposed to generate a second angle error signal to control the angle adjustment unit,
 wherein the first angle error signal is generated from detecting a difference in polarization of a first diffracted beam and a second diffracted beam from the hologram with the second photodetector and the third photodetector when casting the first light beam and the second light beam onto the optical information storage medium from the angle adjustment unit, the first diffracted beam and the second diffracted beam corresponding to the first light beam and the second light beam,
 wherein the second angle error signal is generated from the fourth photodetector disposed in the angle detection unit,
 wherein the angle adjustment unit varies the angle of incidence of the first light beam and the second light beam incident on the optical information storage medium according to the first angle error signal and thereafter switches to vary the angle of incidence of the first light beam and the second light beam incident on the optical information storage medium according to the second angle error signal.

* * * * *